UNITED STATES PATENT OFFICE.

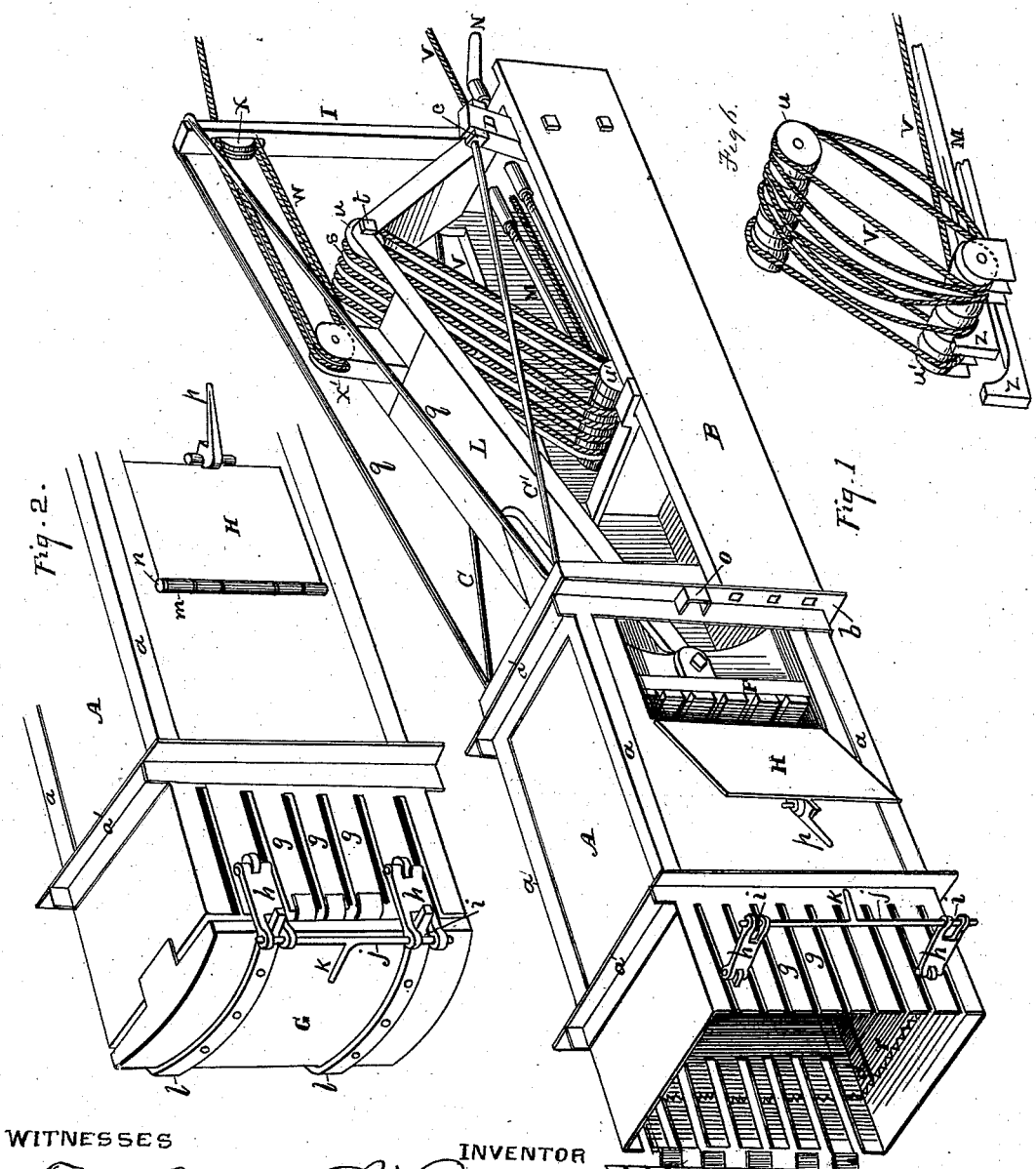

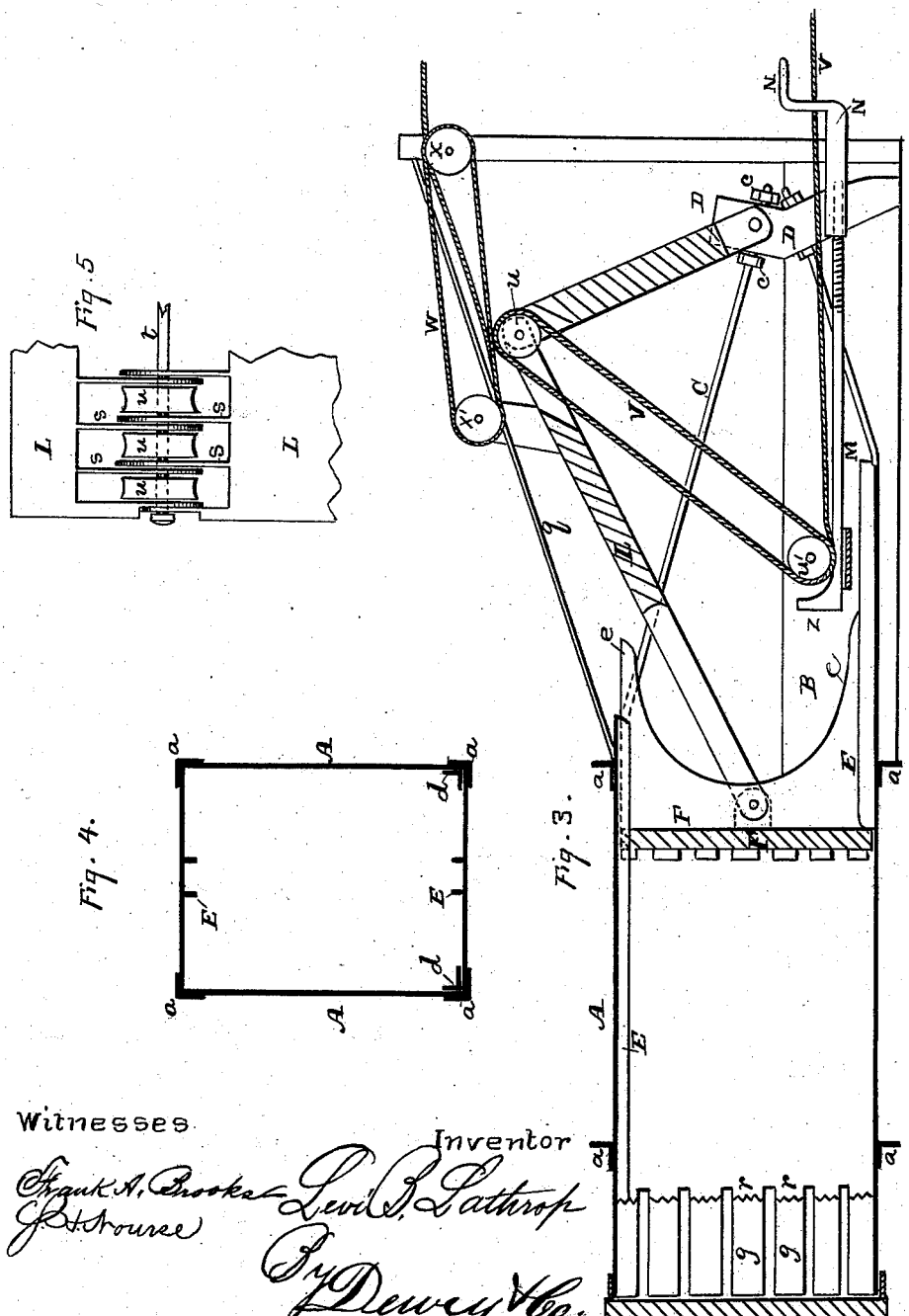

LEVI B. LATHROP, OF HOLLISTER, CALIFORNIA.

HAY-PRESS.

SPECIFICATION forming part of Letters Patent No. 225,396, dated March 9, 1880.

Application filed October 6, 1879.

*To all whom it may concern:*

Be it known that I, LEVI B. LATHROP, of Hollister, county of San Benito, and State of California, have invented an Improvement in Hay-Presses; and I hereby declare the following to be a full, clear, and exact description thereof.

The object of my invention is to construct a press for baling hay, wool, cotton, hops, &c., which shall be light and portable, and at the same time strong and durable; to which end I construct the body of the press of boiler and angle iron. The body of the press is peculiarly constructed, as are the doors.

The follower, which moves in guides in the press, is actuated by a toggle-joint or knee-lever, to which power is applied by means of a series of ropes and pulleys.

By using peculiar stops any desired part of the power of the purchase is cut off, so that the horses need not travel so far with the end of the rope, in drawing the toggle down, as they would have to do were all the parts of the purchase moving.

When the pressure is applied the first time only part of the purchase is used; but on the last purchase being applied the stops are removed and the whole power of the purchase is utilized. The pulleys or sheaves over which the ropes pass are journaled on the hinge-pin of the knee-lever, so as to do away with the use of blocks and allow the lever to be straightened without too much space being occupied by the purchase, as is more fully described in the accompanying drawings, in which—

Figure 1 is a general view. Fig. 2 is a view of the door with its fastenings. Fig. 3 is a longitudinal section. Fig. 4 is a transverse section. Fig. 5 shows the method of uniting the toggle-levers. Fig. 6 is a detail of the purchase-ropes.

The press is designed to be permanently placed upon a four-wheeled wagon, and when the press is in use the wheels are locked or the tongue staked to the ground, so that the wagon is immovable.

The body of the press A is formed of boiler and angle iron combined and arranged so as to insure great strength with lightness. The corners $a$ are made of angle-iron, to which the plates are bolted, and the strengthening-bands $a'$, encircling the press, are of angle-iron, which stiffens the whole structure. The structure may thus be subjected to great strain, and will not give under it, as wood is apt to do. Wooden presses are apt to shrink and swell and work in the joints, bolt-holes, and fastenings; but the iron press, with its iron frame solidly riveted after the manner of a steam-boiler, will not work loose, and is a great deal more durable than iron-lined wood presses.

The body of the press is attached to wooden sills or frame-work B by flanges $b$, which form part of the press, and have angle-iron ribs $d$ at their bottoms, as shown.

Braces C C', made adjustable by passing through brace-blocks D at the rear ends of the sills, and having nuts $c$ upon them, connect with the upper and lower rear corners of the press, being secured to the angle-iron corners, as shown. The vertical corner-pieces answer as trusses, so that a direct line of bracing is formed by the angle-iron corners and the braces from the door of the press to the rear end of the sills, thus giving great strength in the line of the strain exerted by the follower, as hereinafter described.

In the bottom of the press, at the corners, are the angle-iron ribs $d$, which extend back and beyond the flange $b$, so as to stiffen them when attached to the wooden sills. The follower rests on these slides, and is guided to its work, so as not to touch or rub on the whole inside of the press, thus reducing friction and wear. The corners of the follower are plated with hardened steel and kept well oiled, so that said follower will work easier even than if on wheels.

Channel-iron guides E are placed on the inside of the top and bottom of the press, in which the ribs or tails $e$ of the follower F fit, thus keeping the follower in true line and preventing it swinging to the sides at any time, even if there is more pressure on one side than the other.

The door G of the press is on the front end, as shown, and is made preferably of wood, with strengthening cross-ribs, as shown. The hinge is rounded at the corner, so that the point of motion is at the inner edge of the door. Extending across the door, on the inside, are iron straps or bands $f$, turned at their ends at right angles, so as to form hooks or clamps $f'$, which close by or over the slotted ends of the sides of the press.

The outer sides of the body of the press are formed with metal bars or tongues $g$, as shown, spaces being left between these bars. The top and bottom of this outer end are solid plates, the same as the body of the press.

The hooks or clamps $f'$ on the straps or bands $f$ are so placed as to close by or over the bars or tongues, and furnish supports to them against lateral pressure from the inside of the press. When the door is closed, therefore, and the bale is being pressed, as hereinafter described, instead of these bars or tongues spreading apart, they are held by the hooks or clamps.

This construction is advantageous for strength and lightness, and it moreover dispenses with an encircling band at the end of the press. Usually there is a band passing entirely around a press at the end, so as to furnish strength to prevent the body of the press being spread apart. In tucking the ropes or wires which bind the bale, they have to be tucked through under these bands, and then tucked through behind the bale.

By the construction shown, dispensing with the encircling band, I have only to tuck the rope at each side of the bale through each slot, thereby saving two tucks at each binding-rope, a great saving of time being thus accomplished. The bale is held perfectly tight as pressed, and is tied before any pressure is released.

An additional advantage is, that when the door is opened the spring of the bars or tongues is sufficient, when released from the side clamps of the door, to relieve a certain amount of pressure on the bale, so that it is easily removed, and as soon as the bale is out the tongues return, by their natural elasticity, to their normal position.

On the upper and lower tongues, on one side, are hinge-bars $h$, having slots $i$ at their ends, as shown. Through the slotted ends of these bars is a rod, $j$, having a lever, K, in its middle, said rod connecting said bars and revolving in its bearings. The ends of the door-bands $l$ are pointed, so as to fit in the slots $i$. When the door is closed the hinge-bars are swung forward, and the ends of the bands $l$ fit in the slots $i$. The lever-handle K is then seized, and by it the rod $j$ is turned, and its friction on the ends of the door-bands swings the hinge-bars $h$ farther around over the bands. The door-bands are rounded or beveled at the ends, so that the farther the rod is turned the tighter the door is bound. To release the door, the bar is turned in the opposite direction until it rolls off the ends of the bands, and the hinge-bars are swung back, allowing the door to open. I thus dispense with any eccentrics to jam the door close.

With the door arranged in this way, to close its clamps around or past the ends of the tongues, the bale is held tight, under full pressure, until after it is tied, and saves having to tuck the binding under a support; nor is there any necessity, as is sometimes the case, of having to open a door on each side before the bale is fastened.

The feed-door H is made of boiler-iron, the same as the body of the press. Knuckles $m$ are formed on the edges of the door, and also on the sides of the press, and a pin, $n$, passes through these knuckles, forming a hinge on which the door swings. In this way there is no opening at the joint when swinging, so that the door cannot fasten in the hay or straw when it is closed. Where the door swings away from the press it is difficult to close it when there is hay inside, since it is apt to get in the crack. By forming the knuckles on the metal door there is no opening left for the hay to enter.

On the angle-iron corner of the press, at the side of the door, is a socket, $o$, and a cam-lever, $p$, is hinged on the door and fitted to engage in this socket. The pivoted end of the lever $p$ is rounded where it is in contact with the door, and has a squared offset or shoulder on it, as shown. When the door is closed the lever is turned so that this square shoulder comes against the inner face of the socket, holding the door so that no internal pressure can push the door out. It is, however, easily released by turning the lever over and drawing the shoulder out of the socket.

At the rear end of the sills is a king-post, I, having braces $q$, which reach to the corners of the press, as shown, this king-post having leading or purchase pulleys at its upper end, for the purpose hereinafter described.

On the inside of the press, and encircling it at any convenient point, preferably where the solid body joins the tongues, is a serrated band or series of teeth or projections, $r$, which hold the hay and prevent it following the follower back when the latter is withdrawn. These teeth are much preferable to a plain rib or flange around the press for this purpose, and, although they do not take up much room, they catch the hay firmly and prevent it springing back when the follower is withdrawn.

The follower is suitably connected by a hinge or pivot with a knee-lever or toggle-jointed bar, L, the shorter and rear arm of said toggle being hinged or pivoted on the brace-blocks at the rear end of the sills, as shown. This knee-lever is made of wood or iron, but preferably of wood bound at its edges with iron. At the meeting ends of the two parts of the toggle-joint and on each part is a series of projecting flanges, $s$, each having a hole through its center, through which passes the hinge-pin $t$, which joins the parts of the toggle. Between each meeting pair of the flanges is placed a grooved pulley or roller, $u$, as shown, the hinge-pin serving as a bearing-shaft for said rollers or sheaves as well. A corresponding series of rollers, $u'$, revolve on a shaft extending between the sills below. Over these rollers u u' extends a rope, V, said rope passing over the upper and under the lower pulleys in regular order, one after the other, so as to afford a purchase of strength proportionate to the number of pulleys. A rope, W, passes around the double pulleys X at the upper end of the king-post and the pulleys X' on the upper part of the knee-joint, so as to form a purchase for drawing the knee-lever up after it has been drawn down, as hereinafter described.

Horses are hitched to the rope V to draw the toggle up and the follower back, so as to clear the feed-door on the side. The body of the press is then filled with hay or other material to be pressed, and the side door closed and held by its catch, as described. The horses are then hitched to the lower rope, and as they draw the toggle down by the purchase the follower is pushed in, sending the hay home, which is kept from returning after the follower by the teeth in the inside of the press. This operation is repeated several times until the press will receive no more. Then the bale is tied, as described, and the follower is withdrawn, after which the front door, G, is opened and another charge of hay is placed in through the side door. As this is forced forward the bale is pushed out, after which the discharge-door is closed until the next bale is completed.

While the bale is being made the first two or three times the follower is pushed forward it goes in easily, and no very great purchase is needed to draw the toggle down. It would, therefore, be a waste of time and power to have the horses go the full length of the rope, as they would have to overhaul the whole of the purchase-rope over the sheaves. I therefore provide stops M, worked by cranks N, these stops having curved or hooked ends Z, as shown, which will stop off any desired part of the purchase. These stops pass under the sheaves w', and by turning the crank all but one or two of the ropes are rendered inoperative by the curved or hooked end of the stop jamming the rope against the sheave. For instance, when the stop is in the third opening from the right, as shown, then only the hauling part and two bights are operated, all the others being stopped. Therefore the horses haul on a double purchase only, and do not have to extend the whole rope to draw the toggle down. On the second pull the first stop is released and another stop thrown in, which will allow more of the rollers to operate, but not all of them. On the next pull both stops are thrown off and the whole purchase is used. Thus the first time the horses would only have to walk about twenty-five feet, the next time fifty feet, and the third time seventy-five feet, to draw the toggle down and send the follower home. I have shown two of these stops in the drawings, but any desired number may be used. The inside or curved and grooved interior face of the hook or clamp on the stops may be corrugated or have spurs or projections upon them to prevent the rope slipping. I thus gain an intermittent or varying power to the toggle without having to disturb the rope forming the purchase.

Either of the stops may be removed to and placed opposite any desired pulley to suit convenience by simply unscrewing them from the nut on the crank and pulling them out from under the pulley where they are placed and putting them under others. The stops are worked by simply turning the crank. Turning to the right tightens them, and turning to the left releases them.

By the method of placing the sheaves in the joint of the toggle the whole arrangement is compact and serviceable and the power is applied at the best point. The two parts of the toggle may even be drawn down below a horizontal line without danger of breakage, as the ends cannot bind. I dispense entirely with all cumbersome blocks in my purchase, and the single hinge-pin answers as a hinge for toggle and journal for sheaves.

The work of the horses is rendered easier by the system of stops, which shut off part of the purchase, as described, and they have to walk no more ground than is absolutely necessary. The driver can shut off or open the stops each time he turns the horses before leaving the press, and does not have to go out of his road to do so. The ropes which are shut off cannot entangle themselves, as they simply lie inert until the stops are removed and they are called into action.

Having thus described my invention, what I claim as new, and desire to secure by Letters Patent, is—

1. The press A, formed of boiler-iron, with its angle-iron corners, ribs, and slides $a$ $d$, said press being provided with the metal tongues or bars $g$ at its front end, and braced by the adjustable braces C C', substantially as and for the purpose herein described.

2. In combination with the press A, with its metal tongues or bars $g$, the door G, with its cross-straps $f$, provided with clamps or hooks $f'$, whereby the bars or tongues are supported laterally from internal strain and the necessity of an outside binding-brace obviated, substantially as herein described.

3. In combination with the door H, the cam-lever $p$, hinged on said door and having a rounded or cam-like inner surface and a shoulder above, said shoulder fitting into the socket $o$ in the press, whereby the door is securely locked, substantially as herein described.

4. In combination with the press A, the angle-iron ribs or slides $d$ and the channel-iron guides E, in which the follower F, with its ribs $e$, fits, whereby said follower is kept in true line and the friction reduced, substantially as herein described.

5. In combination with the press A, formed of boiler-iron and provided with the strengthening-bands $a$, the braces C C', made adjustable by the nuts $c$ and the brace-blocks D on the sills B, whereby the press is strengthened in the line of strain when the bale is being pressed, substantially as herein described.

6. In combination with the press A, the follower F, with its toggle or knee joint operating lever L, said lever being provided with the flanges s, pin t, and pulleys u, and operated by the rope V, passing under the pulleys u', substantially as herein described.

7. In combination with the rope V, forming the purchase for operating the knee-lever L, moving the follower F in the press A, said rope passing over the pulleys u u', the stops M, with their hooked ends Z, whereby any parts of said rope may be stopped from operating and a varying power be gained from the same purchase without change, substantially as herein described.

In witness whereof I have hereunto set my hand.

LEVI B. LATHROP.

Witnesses:
CHAS. G. YALE,
S. H. NOURSE.